Patented Mar. 27, 1934

1,952,116

UNITED STATES PATENT OFFICE

1,952,116

POLYMERIZATION OF UNSATURATED ORGANIC MATERIALS

Percy W. Bridgman and James B. Conant, Cambridge, Mass., assignors to E. I. du Pont de Nemours & Company, Wilmington, Del., a corporation of Delaware No Drawing. Application July 5, 1929, Serial No. 376,271

9 Claims. (Cl. 260—2)

This invention relates to the treatment of organic compounds capable of being polymerized and to the resulting products. More particularly it relates to a process of effecting the polymerization, of such compounds as may be polymerized by the use of heat or chemical agents, by extremely high pressures and to the products so obtained.

The polymerization of unsaturated hydrocarbons of the butadiene type has previously been accomplished either by the use of catalysts alone, or by heating in closed vessels. The pressures heretofore employed have not exceeded substantially 3300 atmospheres.

Applicants have now made the discovery that organic transformations may be brought about or accelerated by the application of extremely high pressures, ranging under conditions set forth in the examples from substantially 2,000 atmospheres to 12,000 atmospheres and even higher, to polymerizable organic compounds either at room temperature or at elevated temperatures. By the use of such extreme pressures the application of heat to compounds which would be deleteriously affected may not only be avoided but we are enabled to carry out the polymerization in a very short time. Moreover, it has been discovered, contrary to what may be expected, that by the use of such high pressures the resulting polymers are not detrimentally affected and possess at least as good solubility as the corresponding polymers obtained by less rapid methods. Furthermore, it is possible to obtain by this method more uniform polymerization than has hitherto been obtained at lower pressures, with the result that the compounds obtained by the present methods exhibit characteristics more closely approaching that of natural rubber. Moreover, as will appear hereinafter, emulsions, solutions and mixtures may be effectively treated by the process of the invention.

The particular manner of applying the pressure is no part of the present invention as any suitable method and apparatus may be employed. Applicants in carrying out the process filled a small glass tube of about 2 cc. capacity with the organic material to be treated. The tube was then placed in a steel container with its open end under a few centimeters of mercury and the whole placed in the usual high pressure apparatus. In brief, the apparatus consisted of three essential parts: a hydraulic pump capable of delivering pressures of up to 15,000 lbs. per square inch; a hydraulic intensifier in which this pressure is stepped up by a ratio of 25 to 1, giving a maximum pressure of 375,000 lbs. per square inch or 25,000 atmospheres; and the high pressure vessel itself. All of the parts with the exception of the high pressure vessel are of the usual or standard type such as can be bought on the market from manufacturers of hydraulic equipment. The reaction vessel employed consisted of an especially heat-treated block of chrome vanadium steel 10 inches long by 6 inches in diameter, drilled with a one-inch hole which comprises the reaction chamber. Suitable high pressure joints, such as described in Proceedings of the American Academy, February 1914, are used for closing the lower end of this hole and for sealing the plunger of the intensifier. A complete description of the apparatus is also given in the article referred to. In this apparatus the pressure was transmitted to the mercury by means of kerosene.

Various embodiments of the invention are described in the following examples. It will be understood, however, that these examples are presented by way of illustration only and that it is not applicants' intention to be limited thereby to the particular reagents or conditions set forth therein.

Example 1. Isoprene (exposed to air)

Small tubes were filled with commercial isoprene, which had been exposed to air. The tubes were then subjected to pressures varying from 3,000 to 12,000 atmospheres. The following results were observed:

| Pressure | Hours | Polymerization |
|---|---|---|
| 3,000 | 68 | Trace. |
| 6,000 | 48 | 10% |
| 9,000 | 24 | 40–45% |
| 12,000 | 50 | 100% |

The degree of polymerization was determined by allowing the material to stand in the open until the unchanged isoprene had evaporated and observing the loss in weight. The transparent solid obtained by the action of 9,000 atmospheres for 24 hours was initially quite soft and on standing 24 hours in the open lost about 60% of its weight and shrank to a dense rubber-like solid. Polymerization at a pressure of 12,000 atmospheres for 50 hours yielded a tough transparent rubber-like solid. On standing in the air there was practically no shrinkage of this solid product.

For comparison, it may be stated that isoprene allowed to stand at room temperature without a catalyst is not completely polymerized in 15 years. With sodium as a catalyst several weeks are required. At temperatures of 70 to 75° a minimum of three weeks is necessary.

*Example 2. Polymerization of 2,3-dimethyl 1,3-butadiene*

A sample of freshly distilled material was polymerized to a soft rubber-like mass by application of 10,000 atmospheres pressure for 24 hours at room temperature.

*Example 3. Polymerization of styrene and indene*

Samples of styrene and indene after being subjected to a pressure of 12,000 atmospheres for 72 hours at room temperature, yielded on evaporation about 10% of solid polymer, as a hard resin. It will be noted that in this case the polymerized product is originally liquid but on evaporation the polymer was obtained as an amorphous glassy material. At room temperature and atmospheric pressure, one month would be required to effect a similar polymerization.

*Example 4. Vinyl acetate*

Vinyl acetate subjected to a pressure of 11,400 atmospheres for 72 hours at room temperature was converted into a completely polymerized transparent rubber-like solid. It is impractical to obtain a corresponding polymerization of vinyl acetate by the use of heat and a catalyst since it is impossible to subsequently remove the catalyst from the resulting polymer.

*Example 5. Vinyl bromide*

Under the same conditions described in Example 4, vinyl bromide yielded a white solid which was very hard and non-elastic.

*Example 6. Isoprene and petroleum ether*

A solution of isoprene in an equal volume of petroleum ether subjected to 12,000 atmospheres for 72 hours at room temperature yielded a colorless sticky gel which was very elastic. After exposure to the atmosphere for some hours the petroleum ether evaporated and left about one fourth of the mixture as a very elastic solid. In the above example petroleum ether functions as a solvent.

*Example 7. Styrene and malonic ester*

A mixture of equal parts of styrene and malonic ester subjected to 12,000 atmospheres for 94 hours at room temperature turned into a soft white rubbery mass.

*Example 8. Vinyl bromide and vinyl acetate*

A mixture of vinyl bromide and vinyl acetate after being subjected to a pressure of 12,000 atmospheres for 100 hours at room temperature was converted into a thick syrup which, on standing at atmospheric pressure, yielded a hard resinous solid upon evaporation of the volatile constituents. Both components were apparently polymerized.

*Example 9. Isoprene (sealed from air)*

Small tubes were filled with a different sample of commercial isoprene than that of Example 1, which had been stored in sealed glass tubes out of contact with air. The tubes were then subjected to a pressure of 12,000 atmospheres for 50 hours at room temperature. The degree of polymerization was determined by allowing the unchanged isoprene to evaporate. The transparent solid obtained represented about 20% of the weight of the original material.

*Example 10. Polymerization of n-butyraldehyde*

Samples of pure n-butyraldehyde converted to a clear glass-like solid of the consistency of cheese by the application of 11,200 atmospheres for 122 hours at room temperature. Samples of the material dried in vacuo for 2 hours became brittle and hard. The melting point range was 115–120°. On standing, the solid slowly reverted to the original aldehyde.

*Example 11. Iso-butyraldehyde*

In another experiment iso-butyraldehyde was converted to a soft waxy solid by the action of 12,000 atmospheres for 40 hours at room temperature. The reaction, however, was evidently not complete since the material smelled strongly of the original aldehyde. The solid product was not one of the known polymers since on standing at room temperature and pressure it slowly reverted to a liquid. This liquid was largely the unchanged aldehyde but contained also a little of a higher boiling material which was insoluble in water and non-acidic.

The following example illustrates the use of a catalyst in addition to high pressure.

*Example 12. Isoprene and benzoyl peroxide*

100 parts of isoprene containing 1 part of benzoyl peroxide as a catalyst was subjected to a pressure of 12,000 atmospheres for 20 hours at room temperature. The resulting product was 75% polymerized.

A sample containing no catalyst was only 50% polymerized under the same conditions.

The following example illustrates the use of a catalyst and heat in addition to high pressures.

*Example 13. Isoprene with catalyst and heat*

A sample of isoprene containing no added catalyst, a sample containing 1 part in 100 parts of benzoyl peroxide and a sample containing about 1 part in 50 parts of benzaldehyde which had been previously exposed to the air and therefore consisted of about 22% peroxide were subjected to 2,000 atmospheres at a temperature of 80° C. for 7 hours. At the end of this time, the samples were converted into viscous liquids which on evaporation at room temperature yielded sticky, elastic solids.

The per cent polymerization of the various samples is indicated below:

| | Percent polymerization |
|---|---|
| Without catalyst | 9 |
| With benzoyl peroxide | 32 |
| With benzaldehyde | 22 |

It is evident from the above examples that polymerizable organic compounds generally are adapted to be transformed when subjected to high pressures. However, in view of the fact that in some cases (see Examples 10 and 11) the polymers so obtained from saturated organic compounds are reversible, the polymers obtained from the unsaturated compounds are distinctly more valuable and consequently the process as applied to unsaturated organic compounds and particularly isoprene represents our preferred embodiment. The unsaturated compounds which may be successfully polymerized include those unsaturated organic compounds which may be polymerized by any other method such as by the use of heat or chemical agents. For example, unsaturated aliphatic hydrocarbons containing two or more conjugated double linkages, as for example, the 1:3-butadienes, polymerizable esters of the unsaturated alcohols, polymerizable unsaturated halides, unsaturated aldehydes, and aromatic compounds with an unsaturated side chain, such as styrene and indene may be polymerized.

It is further evident that the process may be applied to mixtures of polymerizable substances as well as to the pure compounds. In such cases the process has a peculiar advantage where ordinarily the use of a separate catalyst would be required for each of the components of the mixture to be polymerized. Moreover, it is evident that the materials polymerized may be in solution in an inert solvent or may be in solution in another polymerizable organic compound. Obviously, also, emulsions of the substances to be polymerized may be treated by this method. Furthermore, it is also obvious that certain compounds such as the simple dienes may be heated above their critical temperature and polymerized.

As illustrated in Example 13, the effect of the pressure may, of course, be supplemented by heat, with the result that the polymerization will be correspondingly accelerated.

Also, it is obvious from the examples that any catalyst which may be employed to promote the polymerization at atmospheric pressure may be employed together with the high pressure process described. Furthermore, it is obvious that the polymerization may be effected by the combined use of heat, catalyst, and high pressure with correspondingly still greater acceleration. When pressures substantially lower than 2,000 atmospheres are employed, the polymerization not only is less uniform but the rate of polymerization is very materially decreased.

By the term "polymerization", as employed hereinabove and in the appended claims, is meant that type of reaction in which two or more molecules of the same substance appear to combine with each other without substantial gain or loss of weight so that the apparent molecular weight of the resulting polymer is always an integral multiple of the molecular weight of the original material.

By the term "polymerizable compounds" as employed herein is intended those compounds which may be polymerized by any of the methods now commonly employed, such as, by the application of heat, by the action of light, by the action of reagents such as sulfuric acid, stannic chloride, metallic sodium, peroxides or by any combination of these conditions or reagents. Obviously, the number of such compounds is very great and they cannot be all specified herein. However, whether a given compound is or is not a member of this class can be readily determined by simple and well known methods of experimentation (see Houben-Weyl, vol. 3—1923).

As many apparent and widely different embodiments of this invention may be made without departing from the spirit thereof, it is to be understood that we do not limit ourselves in the foregoing examples or description except as indicated in the following claims:

We claim:

1. In the process of treating unsaturated polymerizable compounds of the class consisting of unsaturated aliphatic compounds containing at least two conjugated double bonds, aromatic compounds containing an unsaturated side chain, unsaturated aliphatic esters, unsaturated aliphatic halides, and unsaturated aliphatic aldehydes, the step which comprises polymerizing said compounds under a pressure of at least 6,000 atmospheres.

2. The process of polymerizing an unsaturated aliphatic hydrocarbon containing two or more conjugated double linkages which comprises subjecting said compound to a pressure of at least 6,000 atmospheres.

3. In the process of polymerizing a diene, the step of accelerating polymerization which comprises subjecting said compound to pressures of at least 6,000 atmospheres.

4. A product obtained by subjecting a polymerizable compound of the class consisting of aromatic compounds containing an unsaturated side chain, unsaturated esters, unsaturated halides, and unsaturated aldehydes, to a pressure of at least 6,000 atmospheres.

5. A polymerization product obtained by subjecting an unsaturated aliphatic hydrocarbon containing two or more conjugated double linkages to a pressure of at least 6,000 atmospheres.

6. A polymerization product obtained by subjecting isoprene to a pressure of at least 6,000 atmospheres.

7. The process of treating a hydrocarbon of the group consisting of the dienes, aliphatic unsaturated aldehydes, vinyl compounds, styrene and indene which comprises subjecting said hydrocarbon to a pressure of at least 6,000 atmospheres.

8. The process which comprises subjecting a polymerizable compound of the class consisting of unsaturated aliphatic esters, unsaturated aliphatic halides, unsaturated aliphatic aldehydes and indene to a pressure of at least 2000 atmospheres to effect polymerization.

9. The process of polymerizing isoprene which comprises subjecting said compound to a temperature of at least substantially 80° C. and a pressure of at least 2000 atmospheres in the presence of benzaldehyde as a catalyst.

PERCY W. BRIDGMAN.
JAMES B. CONANT.